(12) United States Patent
David

(10) Patent No.: US 8,534,583 B2
(45) Date of Patent: Sep. 17, 2013

(54) DRAG MECHANISM FOR A FISHING REEL

(75) Inventor: Nilsen David, Corona, CA (US)

(73) Assignee: Accurate Fishing Products, Corona, CA (US)

( * ) Notice: Subject to any disclaimer, the term of this patent is extended or adjusted under 35 U.S.C. 154(b) by 0 days.

(21) Appl. No.: 11/462,664

(22) Filed: Aug. 4, 2006

(65) Prior Publication Data

US 2008/0041999 A1    Feb. 21, 2008

(51) Int. Cl.
*A01K 89/01* (2006.01)
(52) U.S. Cl.
USPC .......................... 242/246; 242/244; 242/303
(58) Field of Classification Search
USPC .................. 242/246, 244, 302–304
See application file for complete search history.

(56) References Cited

U.S. PATENT DOCUMENTS

| | | | | |
|---|---|---|---|---|
| 4,702,432 A * | 10/1987 | Kaneko et al. | | 242/246 |
| 4,728,053 A * | 3/1988 | Hitomi | | 242/246 |
| 4,911,378 A * | 3/1990 | Hitomi | | 242/246 |
| 4,951,897 A * | 8/1990 | Takeuchi | | 242/246 |
| 5,007,602 A * | 4/1991 | Carlsson | | 242/246 |
| 5,040,743 A * | 8/1991 | Zurcher et al. | | 242/246 |
| 5,149,008 A * | 9/1992 | Oi | | 242/246 |
| 5,328,127 A * | 7/1994 | Yoshikawa | | 242/246 |
| 5,988,547 A * | 11/1999 | Koelewyn | | 242/246 |
| 6,283,393 B1 * | 9/2001 | Kang | | 242/246 |
| 6,286,772 B1 * | 9/2001 | Koelewyn | | 242/246 |
| 6,598,819 B2 * | 7/2003 | Furomoto | | 242/319 |
| 6,641,069 B2 * | 11/2003 | Katayama et al. | | 242/246 |
| 6,766,975 B2 * | 7/2004 | Yamaguchi | | 242/246 |
| 6,874,718 B1 * | 4/2005 | Chang | | 242/246 |
| 6,880,777 B2 * | 4/2005 | Sugawara | | 242/322 |
| 6,971,601 B2 * | 12/2005 | Sugawara | | 242/307 |

* cited by examiner

*Primary Examiner* — Emmanuel M Marcelo

(57) ABSTRACT

A drag mechanism for a fishing reel having a dual braking configuration to provide efficient drag control is provided. A spool is rotatable on a drag shaft. A first braking pad and a second braking pad are disposed on opposite ends of the spool. A first braking surface engages the first braking pad, and a second braking surface engages the second braking pad. Means are provided for translating each of the first braking surface and the second braking surface on the drag shaft to control the engagement with each of the first braking pad and second braking pad, respectively. More braking force is provided when the first braking surface and the second braking surface are translated toward the longitudinal center of the spool.

11 Claims, 5 Drawing Sheets

DRAG MECHANISM FOR A FISHING REEL

FIELD OF THE INVENTION

The present invention relates to fishing reels, and more specifically, to a drag mechanism for a fishing reel.

BACKGROUND OF THE INVENTION

Fishing reels with various drag constructions are known in the art. However, earlier drag constructions have proven to be inefficient when a torque load is applied to the spool as a result of line being pulled from the reel.

One prior art construction includes a plurality of brake pads and washers contained within the cylinder of the spool. Such a configuration does not provide effective and controlled drag for the spool.

In other prior art constructions, unbalanced and uneven braking force is applied to the spool. These reels fail to perform efficiently when a torque load is applied to the spool. When line is pulled off of the spool and the line travels across the spool cylinder, torque force is applied to different areas of the spool.

SUMMARY OF THE INVENTION

In accordance with one embodiment of the present invention, a drag mechanism for a fishing reel includes a drag shaft, a spool, a first braking pad, a first drag washer, and an adjustable fastener. The spool includes a cylinder between first and second rims extending outwardly beyond the cylinder. The first rim includes a cavity defining a first annular surface adjacent to a forward end of the cylinder. The spool defines a longitudinal opening that receives the drag shaft, the spool being freely rotatable on the drag shaft about a longitudinal axis of the drag shaft. The first braking pad is rotationally affixed to the spool within the first rim. The first drag washer engages the first braking pad. The adjustable fastener is disposed on the drag shaft and configured to selectively adjust the engagement between the first drag washer and the first braking pad.

In accordance with another embodiment of the present invention, a drag mechanism for a fishing reel is disclosed. The drag mechanism includes a drag shaft, a spool, a first braking pad, a first drag washer, a second braking pad, and a second drag washer. The first braking pad is substantially equal to the diameter of the second braking pad, and the diameter of the first drag washer is substantially equal to the diameter of the second drag washer. The drag shaft has a flange at a proximal end of the drag shaft and a movable fastener at a distal end of the drag shaft. The spool is on the drag shaft between the flange and the fastener, the spool having a proximal annular surface and a distal annular surface. The first braking pad is adjacent to the proximal annular surface. The first drag washer is between the first braking pad and the flange. The second braking pad is adjacent to the distal annular surface. The second drag washer is between the second braking pad and the fastener. The first drag washer, the first braking pad, the spool, the second braking pad, and the second drag washer are secured between the flange and the fastener.

In accordance with yet another embodiment of the present invention, a drag mechanism for a fishing reel includes a drag shaft, a spool having first and second ends rotatable on the drag shaft, a first braking pad on the first end of the spool, a second braking pad on the second end of the spool, a first braking surface for engaging the first braking pad, a second braking surface for engaging the second braking pad, and means for translating each of the first braking surface and the second braking surface on the drag shaft to control the engagement with each of the first braking pad and second braking pad, respectively.

BRIEF DESCRIPTION OF THE DRAWINGS

The above and other features and advantages of the present invention will be better understood with reference to the following detailed description when considered in conjunction with the accompanying drawings in which.

DETAILED DESCRIPTION OF THE INVENTION

In one embodiment of the present invention, drag configurations are provided for use in conjunction with fishing reels. The drag configurations may be used on spools integrated into conventional fishing reels. The spool shown in the accompanying illustrations is configured for use on a spinning reel type fishing reel. However, one of ordinary skill will appreciate that the inventive drag configurations may be incorporated into any conventional spinning reels. Furthermore, while illustrated in a spinning reel configuration, the inventive drag configurations are not limited to specific fishing reel configurations.

Figure 1:
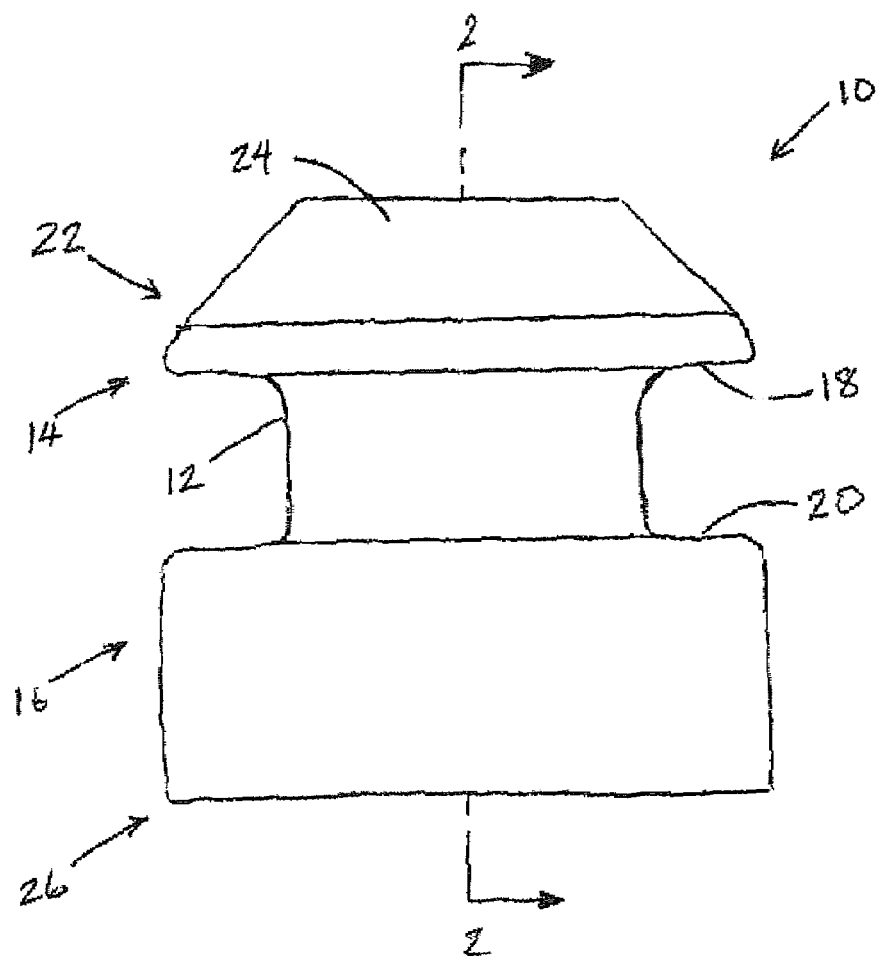
FIG. 1 is a side view of a spool of a fishing reel in accordance with one embodiment of the present invention.

Referring to FIG. 1, one embodiment of a drag mechanism in accordance with the present invention includes a spool 10 having a cylinder 12 for holding fishing line wound upon the cylinder 12 between a forward rim 14 and a rear rim 16. The rims 14,16 are generally cylindrical but can be any other suitable shape. Each of the forward rim 14 and the rear rim 16 extend outwardly beyond the outer diameter of the cylinder 12 to form a forward rim wall 18 and a rear rim wall 20. The forward rim wall 18 and the rear rim wall 20 each comprise an annular shaped surface that is oriented at a slight angle from perpendicular to the longitudinal axis of the spool. Each of the forward rim 14 and the rear rim 16 is bored out to form a cavity within each of the rims. A forward or distal end 22 of the spool 10 may have a cover 24 for enclosing the top of the spool 10 to help prevent dirt and debris from entering the spool 10.

A drag adjustment knob or drag adjustment mechanism 79 (shown in FIG. 4), described in greater detail below, may also be included to adjust the amount of drag force applied to the spool 10. The drag adjustment knob may also be incorporated into the cover 24. In one embodiment, the drag adjustment knob is located at the top of the spool 10 and rotatable in clockwise and counter clockwise directions. Rotation of the knob may engage a fastener, also described in greater detail below, within the spool 10 to either increase or decrease the amount of drag exerted on the spool 10. A rear or proximate end 26 of the spool is configured for engagement with a fishing reel body (not shown). Fishing reel bodies that can be used with the disclosed spool and drag mechanism are known in the art. It will be immediately apparent to a person of ordinary skill in the art how to adapt an embodiment of the present invention to conventional fishing reels.

Figure 2:
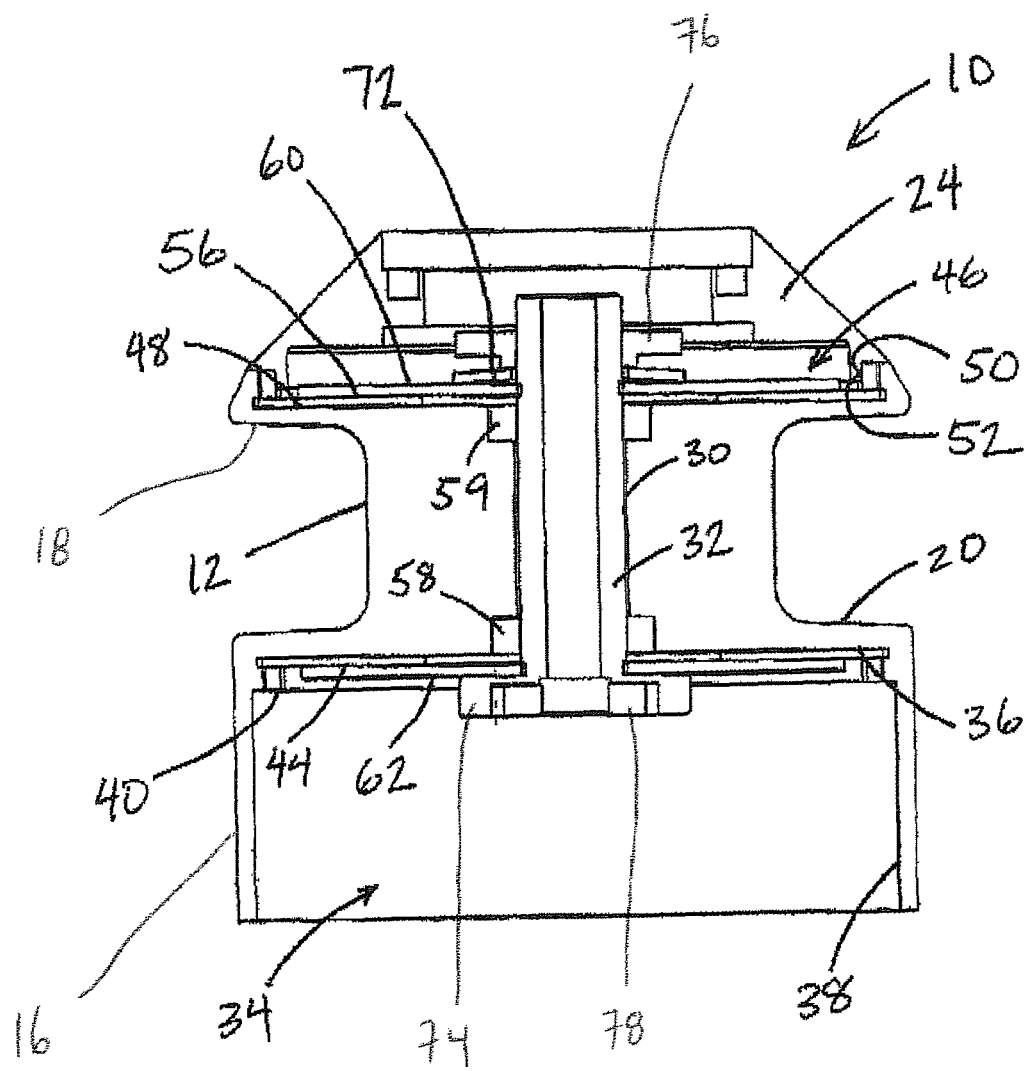
FIG. 2 is a sectional view of the spool of FIG. 1 taken along the line 2-2.
Figure 3:
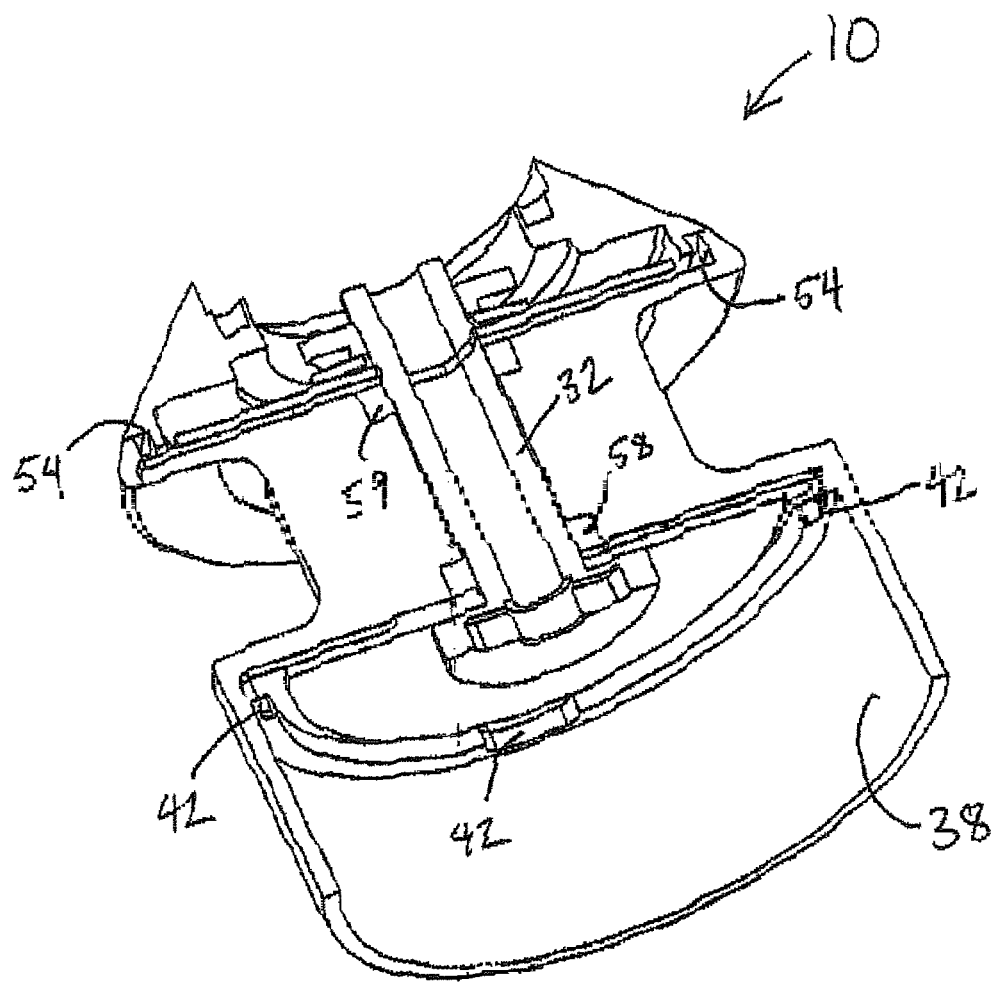
FIG. 3 is a sectional perspective view of the spool of FIG. 1 taken along the line 2-2.

Referring now generally to FIGS. 2 and 3, the spool 10 defines a longitudinal opening 30, which extends through the spool along the longitudinal axis of the spool 10. The opening 30 is configured to receive a drag shaft 32 which is used to rotationally engage the spool 10. The drag shaft is rotationally coupled to a spool shaft (not shown), placed along the longitudinal axis of the spool, and extending through a central bore of the drag shaft 32. The bored out portion of the rear rim 16 forms a cylindrical rear cavity 34 having a rear annular surface 36 and a rear annular wall 38. The rear annular surface 36 abuts the rear end of the cylinder 12 and is on the opposite side of the rear rim wall 20 facing away from the cylinder. The rear annular surface 36 spans in a radial direction across the cylinder 12 and also substantially across the rear rim wall 20. The rear annular surface 36 includes a rear annular ridge 40 abutting both the rear annular surface 36 and the inside of the rear annular wall 38. The rear annular ridge 40 extends inward from the rear annular wall 38 and outward from the inner annular surface 36. The rear annular ridge 40 includes a plurality of notches 42 or slots for rotationally securing a rear braking pad 44 within the spool 10. In another embodiment, the notches 42 for securing the rear braking pad 44 may be formed directly into the rear annular wall 38.

Figure 5:
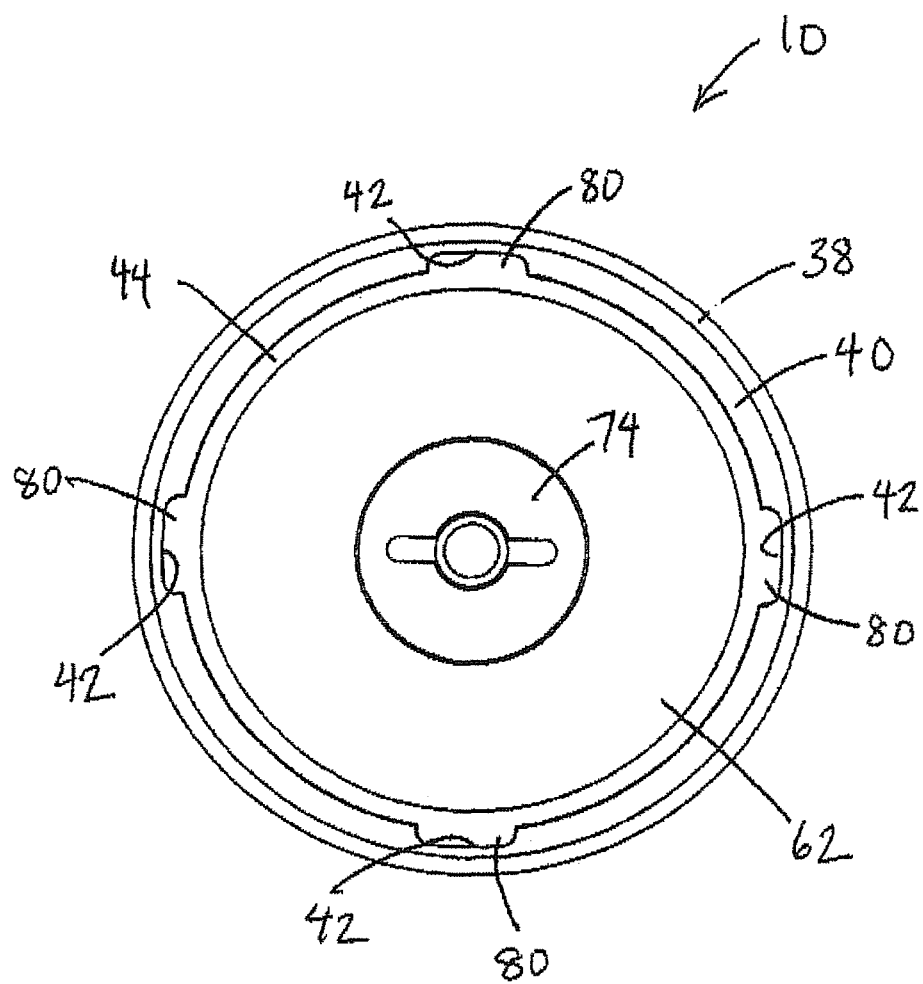
FIG. 5 is a bottom view of the spool shown in FIGS. 1 and 2.

Referring additionally to FIG. 5, a bottom view of the spool 10 is shown. The plurality of notches 42 on the inner portion of the rear annular ridge 40 are shown. Four notches 42 are shown in the illustrated embodiment. However, any other suitable types and number of notches 42 may be used. The rear braking pad 44 has a plurality of tabs 80 corresponding to the plurality of notches 42 in the rear annular ridge 40 to generally secure the rear braking pad 44 from rotation within the rear cylindrical cavity 34.

Referring to FIGS. 2 and 3, the bored out portion of the forward rim forms a cylindrical forward cavity 46 having a forward annular surface 48 and forward annular wall 50. The forward annular surface 48 abuts the forward end of the cylinder 12 and is on the opposite side of the forward rim wall 18 facing away from the cylinder. The forward annular surface 48 spans (in a radial direction) across the cylinder 12 and also substantially across the forward rim wall 18. In the embodiment illustrated in FIGS. 2 and 3, the forward annular wall 50 is shorter than the rear annular wall 38. The forward annular surface 48 also includes a forward annular ridge 52 having a similar configuration to the rear annular ridge 40.

However, the forward annular wall 50 and the forward annular ridge 52 are illustrated as generally indistinguishable. In another embodiment, the forward annular wall 50 may be higher such that the forward annular wall 50 and the forward annular ridge 52 are distinguishable from each other, similar to the rear annular wall. The forward annular ridge 52 includes a plurality of notches 54 or slots for rotationally securing a forward braking pad 56 within the spool 10. In another embodiment, the notches 54 for securing the forward braking pad 44 may be formed directly into the forward annular wall 38.

The spool 10 rides on rear and forward ball bearings 58, 59, respectively which ride on the drag shaft 32 and help facilitate rotation of the spool 10 on the drag shaft 32. Other suitable friction-reducing devices may be used to facilitate efficient and free rotation of the spool 10 on the drag shaft 32.

The forward braking pad 56 has a first side that abuts the forward annular surface 48. In an exemplary embodiment, the forward braking pad 56 is rotationally affixed to the spool 10 such that both the spool 10 and the forward braking pad 56 rotate substantially in unison. A forward drag washer 60 abuts a second side of the forward braking pad 56, opposite the first side, such that a frictional force is created between the forward drag washer 60 and the second side of the forward braking pad 56. The side of the forward drag washer 60 abutting the forward braking pad 56 is referred to as a braking surface. The rear braking pad 44 and a rear drag washer 62 are configured similarly on the rear end of the spool 10, as best shown in FIG. 2. The drag washers 60, 62 may overlie substantially all of the braking pads 44, 56 in order to maximize the braking surfaces. The braking surface may be varied according to the extent to which the drag washers overlie the braking pads. For example, the drag washers 60, 62 may overlie approximately 50 percent to approximately 95 percent of the braking pads 44, 56.

Figure 4:
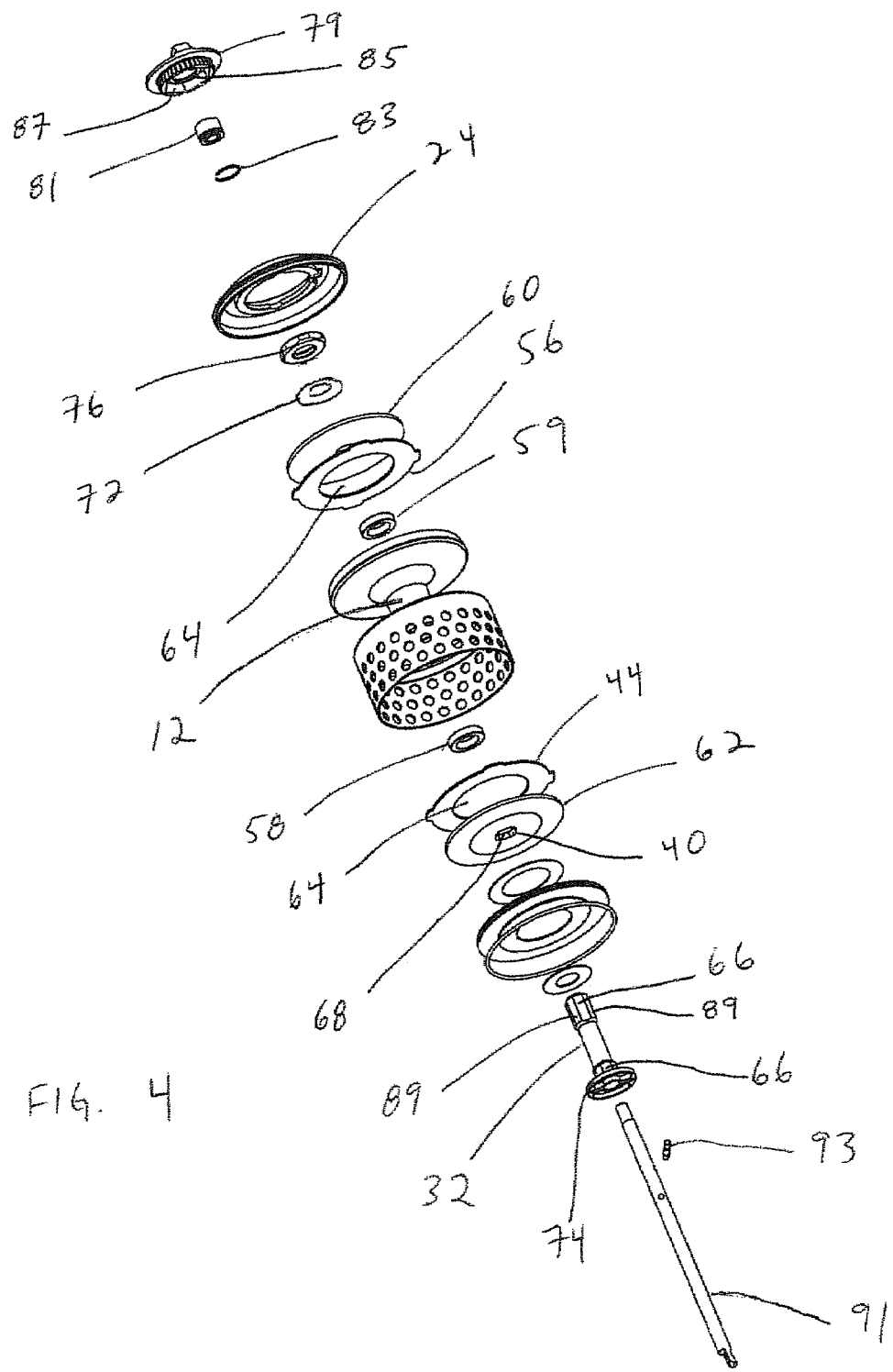
FIG. 4 is an exploded view of the spool shown in FIGS. 1 and 2.

Referring to FIGS. 2, 3 and 4, each of the braking pads 44, 56 have an annular shape including an opening 64 in the center of the braking pad. The openings 64 have diameters greater than the diameter of the drag shaft 32. Therefore, the braking pads 44, 56 do not contact the drag shaft 32. The braking pads 44, 56 may have any suitable dimensions and shape to produce an efficient braking force. However, in one exemplary embodiment, there is a predetermined amount of radial space between the drag shaft 32 and the inner portion of the braking pads 44, 56.

In accordance with one embodiment of the invention, the braking pads are carbon fiber washers, but could be formed of any other suitable material. In addition, the braking pads may comprise different materials on each side of the braking pad. For example, the side of the braking pad engaging the drag washer may include a carbon fiber material to generate controllable frictional force when each of the braking pad and the drag washer rotate in opposite directions or at different rates of rotation. However, since, in one embodiment, the braking pad may be rotationally affixed to the spool, no rotational friction is generated between the braking pad and the spool 10. As such, the side of the braking pad engaging the spool 10 need not be constructed from the same carbon fiber as the other side of the braking pad.

In one exemplary embodiment, the drag shaft 32 rotationally engages the rear drag washer 62. The drag shaft 32 includes a pair of raised, profiled surfaces 66 located at proximal and distal ends of the drag shaft 32, as shown in FIG. 4. The profiled surfaces 66 may be provided in any arrangement or pattern. The rear drag washer 62 has a generally circular opening 68 in the center of the drag washer 62 configured to receive the drag shaft 32. The opening 68 includes a profiled surface 70 that receives the profiled surface 66 of the drag shaft 32. The interaction between the profiled surface 66 and the profiled surface 70 provides for rotational engagement of the rear drag washer 62 by the drag shaft 32. However, the rear drag washer 62 may be translated along the drag shaft 32 in a longitudinal direction. The forward drag washer 60 is similarly configured on the opposing end of the spool 10.

As best shown in FIG. 2, the drag shaft 32 extends through the rear drag washer 62, the rear braking pad 44, a rear ball bearing 58, the cylinder 12, a forward ball bearing 59, the forward braking pad 56, the forward drag washer 60, and a bevel washer 72. The rear end of the drag shaft 32 may have a groove 78 or other opening configured to rotationally engage a driving mechanism of a fishing reel. The rear braking pad 44 and the forward braking pad 56 are secured against the respective inner annular surfaces 36, 48 of the spool by the rear drag washer 62, the forward drag washer 60, and the drag shaft 32. The drag shaft 32 has a flange 74 on its rear end and a fastener 76 on its forward end. The fastener 76 and the flange 74 engage the forward drag washer 60 and the rear drag washer 62, respectively. The forward drag washer 60 and the rear drag washer 62 engage the forward braking pad 56 and rear braking pad 44, respectively.

With reference again to FIG. 4, a drag adjustment knob 79 is incorporated into the cover 24. The drag adjustment knob 79 is capable of rotating within the cover 24. A connection nut 81 may be embedded in the drag adjustment knob 79, and may rotate relative to the drag adjustment knob. The connection nut 81 is held in the drag adjustment knob 79 by a retaining ring 83 which snaps behind a retaining rim 85 of the drag adjustment knob 79. An outer surface of the connection nut 81 extends through openings in the drag adjustment knob 79, allowing a user to rotate the connection nut 81 independent of the drag adjustment knob 79.

The drag adjustment knob 79 includes an inner cavity 87 that is shaped to receive the fastener 76. The fastener 76 may be substantially hexagonal, and the inner cavity 87 may also be substantially hexagonal such that when the fastener 76 nests within the inner cavity 87, the drag adjustment knob 79 and the fastener 76 are rotationally coupled. The fastener 76 has interior threading which engages a threaded portion 89 of the profiled surface 66 of the drag shaft 32. By virtue of the threaded engagement, the fastener 76 translates along the axis of the spool as it rotates relative to the drag shaft 32 about the axis of the spool. As the drag adjustment knob 79 rotates relative to the drag shaft 32, the fastener 76 rotates, and translates along the axis of the spool relative to the drag shaft 32, according to the direction in which the drag adjustment knob 79 is rotated. Thus, the fastener 76 is capable of moving toward and away from the flange 74 of the drag shaft 32.

The connection nut 81 includes interior threading which engages a spool shaft 91 passing through the components shown in FIG. 4. The spool shaft 91 is rotationally coupled to the drag shaft 32 by a pin 93 which engages the flange 74. Thus, rotation of the connection nut 81 relative to the spool shaft 91 causes relative movement between the connection nut 81 on one hand and the drag shaft 32 and the spool shaft 91 on the other hand, along the axis of the spool. The connection nut 81 normally receives the spool shaft 91, and generally serves to hold the components of the drag mechanism together, while the drag mechanism knob 79 controls the drag on the spool 10, as described herein.

In one embodiment of the present invention, a drive mechanism is operated by using the spool 10 in conjunction with a spinning reel body having a crank and associated mechanical components. Operation of a spinning reel body is known in the art. The drag shaft 32 and the spool shaft 91 are driven in rotation by a user of the spinning reel. Consequently, the forward and rear drag washers 60, 62, which are in rotational engagement with the drag shaft 32, rotate in the same direction as the drag shaft. The spool 10 is also rotated in the same direction as the drag shaft 32 and the forward and rear drag washers 60, 62 by the frictional force exerted by the forward and rear drag washers 60, 62 against the forward and rear braking pads 56, 44, respectively, which are rotationally coupled to the spool. In operation of the drag mechanism, torque force is applied in a first direction to the drag washers by the drag shaft, and torque force is applied in a second, opposing direction to the spool 10 by tension applied to the fishing line on the cylinder 12. When the amount of frictional force between the braking pads 56, 44, and the drag washers 60, 62 exceeds the amount of opposing torque force, the spool 10 and the drag washers 60, 62 will travel at the same rate of rotation. However, when the amount of opposing torque force exceeds the frictional force between the braking pads 56, 44 and the drag washers 60, 62, the surface of the drag washers engaging the braking pads 56, 44 may slip, and each of the drag washers 60, 62 and the braking pads 56, 44 may rotate at different rates of rotation or in opposite directions of rotation. The amount of frictional force between the braking pads 56, 44 and the drag washers 60, 62 may be increased by rotating the drag adjustment knob 79, thus moving the fastener 76 toward the flange 74 on the drag shaft 32, which thereby increases the inward longitudinal force of the drag washers 60, 62 against the braking pads 56, 44 and the cylinder 12. The frictional force between the drag washers 60, 62 and the braking pads 56, 44 increases as the inward longitudinal force is increased.

Likewise, the amount of frictional force between the braking pads 56, 44 and the drag washers 60, 62 may be decreased by rotating the drag adjustment knob 79 in an opposite direction, thus moving the fastener 76 away from the flange 74 on the drag shaft 32, which thereby decreases the inward longitudinal force of the drag washers 60, 62 against the braking pads 56, 44 and the cylinder 12. The frictional force between the drag washers 60, 62 and the braking pads 56, 44 decreases as the inward longitudinal force is decreased. In accordance with an exemplary embodiment of the invention, braking forces are applied at both ends of the spool 10, thereby achieving a balance of loads on the spool 10. With this dual braking configuration, substantially equal force is exerted on each side of the spool 10 by the forward drag washer 60 on the forward braking pad 56 and by the rear drag washer 62 on the rear braking pad 44. This dual braking arrangement also reduces or substantially eliminates distortion of the spool as line is pulled off of the cylinder 12.

In accordance with another embodiment of the present invention, a single braking pad may be used in the described configuration at either end of the spool 10. While the illustrated embodiments show a dual braking configuration, a single braking pad configuration may also provide improvements over the prior art mechanisms. Furthermore, any number of additional braking pads may be incorporated into the drag mechanism. Accordingly, embodiments of the present invention need not be limited only to one or two braking pads. Additionally, any number of braking surfaces may also be incorporated. One of ordinary skill in the art will readily appreciate that such modifications, variations, and combinations are possible without departing from the principal, spirit and scope of the invention.

In accordance with yet another embodiment of the present invention, the braking pads need not be rotationally affixed to the spool 10. One of ordinary skill in the art will readily appreciate that braking forces on the spool 10 may be generated using a variety of combinations of fixed and/or moving surfaces. For example, the braking pads may be rotationally affixed to the drag shaft 32 such that line being pulled from the spool 10 will cause rotational friction between the rotating spool 10 and the fixed or counter-rotating braking pads. In another example, the braking pads may be freely rotatable on the drag shaft 32. A person of ordinary skill in the art will appreciate that the various components described above may be constructed from a variety of materials suitable for the particular uses of the drag mechanism. However, in one exemplary embodiment in accordance with the present invention, the cylinder 12 and cover 24 are constructed from aluminum or an aluminum alloy, the drag washers 60, 62 are constructed from titanium or a titanium alloy, and the drag shaft 32, the bevel washer 72, and the fastener 76 are constructed from stainless steel.

The preceding description has been presented with reference to exemplary embodiments of the invention. Workers skilled in the art and technology to which this invention pertains will appreciate that alterations and changes in the described structure may be achieved without meaningfully departing from the principal, spirit and scope of this invention. Accordingly, the foregoing description should not be read as pertaining only to the specific structure described and illustrated in the accompanying drawings, but rather, should be read as consistent with and support for the following claims, which are to have their fullest and fairest scope.

What is claimed is:

1. A drag mechanism for a fishing reel comprising:
   a drag shaft;
   a spool rotatable on the drag shaft, the spool having first and second ends;
   a first braking pad on the first end of the spool;
   a second braking pad on the second end of the spool;
   a first braking surface for engaging the first braking pad, and a second braking surface for engaging the second braking pad; and
   means for translating each of the first braking surface and the second braking surface on the drag shaft to control the engagement with each of the first braking pad and second braking pad, respectively, wherein the first and second braking pads and the first and second drag washers are each generally circular and have a diameter, wherein the diameter of the first braking pad is substantially equal to the diameter of the second braking pad, and wherein the diameter of the first drag washer is substantially equal to the diameter of the second drag washer.

2. The drag mechanism of claim 1, wherein a distal end of the drag shaft is threaded, the fastener being threadedly engaged with the distal end of the drag shaft, wherein the fastener is rotatable to selectively adjust a frictional force between the first drag washer and the first braking pad.

3. The drag mechanism of claim 1, further comprising a bevel washer between the second drag washer and the fastener.

4. The drag mechanism of claim 1, wherein controlling the engagement adjusts the amount of frictional force between the first braking surface and the first braking pad and the amount of frictional force between the second braking surface and the second braking pad.

5. The drag mechanism of claim 4, wherein the first braking surface generates a first braking force and the second braking surface generates a second braking force, wherein the first braking force is substantially equal to the second braking force.

6. The drag mechanism of claim 5, wherein increased braking force is generated when the first braking surface and the second braking surface are translated longitudinally toward the longitudinal center of the spool, and wherein reduced braking force is generated when the first braking surface and the second braking surface are translated longitudinally from the longitudinal center of the spool.

7. The drag mechanism of claim 5, wherein the braking forces are controlled by longitudinal translation of the first and second braking surfaces.

8. The drag mechanism of claim 1, wherein the translation means include a threaded fastener.

9. The drag mechanism of claim 1, wherein the first braking surface overlies substantially all of the first braking pad, and wherein the second braking surface overlies substantially all of the second braking pad.

10. The drag mechanism of claim 1, wherein the first braking surface overlies approximately 50 percent to approximately 95 percent of the first braking pad, and wherein the second braking surface overlies approximately 50 percent to approximately 95 percent of the second braking pad.

11. The method of manufacturing a fishing reel, where the method comprises:
    producing a drag shaft with a rotable spool having a first and second breaking pads respectively on the first and second ends where the first and second breaking pads are equal size.

* * * * *